(12) United States Patent
Xiao et al.

(10) Patent No.: US 9,888,348 B2
(45) Date of Patent: Feb. 6, 2018

(54) UE-ASSISTED NETWORK POSITIONING METHOD AND RELATED EQUIPMENT

(71) Applicant: Huawei Technologies Co., Ltd., Shenzhen, Guangdong (CN)

(72) Inventors: Dengkun Xiao, Shenzhen (CN); Jie Cui, Shenzhen (CN); Yuan He, Shenzhen (CN); Jiangbo Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 14/463,295

(22) Filed: Aug. 19, 2014

(65) Prior Publication Data

US 2015/0011240 A1 Jan. 8, 2015

Related U.S. Application Data

(63) Continuation of application No. PCT/CN2013/071693, filed on Feb. 20, 2013.

(30) Foreign Application Priority Data

Feb. 20, 2012 (CN) .......................... 2012 1 0038267

(51) Int. Cl.
*H04W 4/02* (2009.01)
*G01S 5/10* (2006.01)
(Continued)

(52) U.S. Cl.
CPC .......... *H04W 4/023* (2013.01); *G01S 5/0289* (2013.01); *G01S 5/10* (2013.01); *G01S 5/12* (2013.01);
(Continued)

(58) Field of Classification Search
CPC ....... H04W 4/02; H04W 4/008; H04W 64/00; H04W 4/021; G01S 5/0009; G01S 5/0257;
(Continued)

(56) References Cited

U.S. PATENT DOCUMENTS 6,195,556 B1 2/2001 Reudink et al.
7,177,652 B1 2/2007 Hopper et al.
(Continued)

FOREIGN PATENT DOCUMENTS

| CN | 1486577 A | 3/2004 |
| CN | 1688892 A | 10/2005 |
| WO | WO 2004008171 A1 | 1/2004 |

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.4.0, pp. 1-296, 3$^{rd}$ Generation Partnership Project, Valbonne, France (Dec. 2011).
(Continued)

*Primary Examiner* — Allahyar Kasraian
(74) *Attorney, Agent, or Firm* — Leydig, Voit & Mayer, Ltd.

(57) ABSTRACT

Embodiments of the present invention discloses a network positioning method and related equipments, the method includes: receiving, by a user equipment (UE), positioning signals of at least three positioning nodes, where the at least three positioning nodes include at least one auxiliary UE, where the auxiliary UE is located within an end-to-end communication range of the UE, and valid position information of the auxiliary UE exists currently; measuring the positioning signals of the at least three positioning nodes, and acquiring a measurement result which comprises time difference of receiving the positioning signals of the at least
(Continued)

three positioning nodes by the UE; calculating, a current position of the UE according to the measurement result and the valid position information of the at least three positioning nodes. The technical solution provided by the present invention can effectively enhance the network positioning precision.

8 Claims, 7 Drawing Sheets

(51) Int. Cl.
    *G01S 5/02*         (2010.01)
    *G01S 5/12*         (2006.01)
    *G01S 5/14*         (2006.01)
    *H04W 4/00*       (2009.01)

(52) U.S. Cl.
    CPC ............... *G01S 5/14* (2013.01); *H04W 4/005* (2013.01); *H04W 4/02* (2013.01)

(58) Field of Classification Search
    CPC ........ G01S 5/0027; G01S 5/0036; G01S 5/02; G01S 5/0289; G01S 5/14; G01S 19/05; G01S 19/25
    USPC ................................................ 455/456.1–457
    See application file for complete search history.

(56) References Cited

U.S. PATENT DOCUMENTS

| | | | |
|---|---|---|---|
| 7,706,369 | B2 | 4/2010 | Roese et al. |
| 8,417,264 | B1* | 4/2013 | Whitney ............... H04W 64/00 455/456.1 |
| 2003/0134647 | A1 | 7/2003 | Santhoff et al. |
| 2004/0008138 | A1 | 1/2004 | Hockley et al. |
| 2010/0029302 | A1 | 2/2010 | Lee et al. |
| 2010/0248637 | A1 | 9/2010 | Sahinoglu et al. |
| 2011/0205110 | A1 | 8/2011 | Abraham et al. |
| 2012/0040685 | A1* | 2/2012 | Escolar-Piedras .... G01S 5/0221 455/456.1 |
| 2014/0122607 | A1* | 5/2014 | Fodor ................. H04W 76/023 709/204 |

OTHER PUBLICATIONS

"$3^{rd}$ Generation Partnership Project; Technical Specification Group Radio Access Network; Evolved Universal Terrestrial Radio Access (E-UTRA); LTE Positioning Protocol (LPP) (Release 10)," 3GPP TS 36.355, V10.4.0, pp. 1-116, $3^{rd}$ Generation Partnership Project, Valbonne, France (Dec. 2011).

"$3^{rd}$ Generation Partnership Project; Technical Specification Group Radio Access Network; Evolved Universal Terrestrial Radio Access (E-UTRA); LTE Positioning Protocol A (LPPa) (Release 10)," 3GPP TS 36.455, V10.2.0, pp. 1-52, $3^{rd}$ Generation Partnership Project, Valbonne, France (Sep. 2011).

\* cited by examiner

UE-ASSISTED NETWORK POSITIONING METHOD AND RELATED EQUIPMENT

CROSS-REFERENCE TO RELATED APPLICATIONS

This application is a continuation of International Patent Application No. PCT/CN2013/071693, filed on Feb. 20, 2013, which claims priority to Chinese Patent Application No. 201210038267.0, filed on Feb. 20, 2012, both of which are hereby incorporated by reference in their entireties.

TECHNICAL FIELD

The present invention relates to the field of communications and, in particular, to a network positioning method and related equipments.

BACKGROUND

Currently, with unceasing development of mobile communication technologies, the demand for positioning services is also increased day by day. Application scenarios of the positioning services show a diversified trend, e.g., emergency position, crime location tracking, navigation, traffic control, etc. But, no matter how diversified the application scenarios are, the industry always hopes to acquire a reliable, efficient and quick method for satisfying the positioning demand, in other words, positioning technologies which are easy to be implemented and of high precision are always the hot pursuit sought by peoples.

Development of the global positioning system (GPS) enables a mobile station having a GPS module to obtain an accurate positioning, however, disadvantages of the GPS are also relatively obvious; firstly, an addition of the GPS module will necessarily increase the cost of the mobile station, secondly, as a satellite positioning technique, the GPS is not suitable for scenarios of a high-density urban area (shaded by buildings). Although the network positioning does not have a high accuracy as the GPS positioning, it is more suitable for the scenarios of the high-density urban area. Hence, an algorithm combining the GPS positioning and the network positioning is a focus of the current research.

Currently, there are two network positioning schemes: one is an uplink time difference of arrival (UTDOA) positioning method, the other is an observed time difference of arrival (OTDOA) positioning method.

According to the UTDOA positioning method, a user equipment (UE) sends an uplink positioning signal (e.g., a sounding reference signal (SRS), etc.), and an estimation of the arrival time of the uplink signal is performed at an evolved node (eNB) side to obtain distance of the eNB and the UE. Thereby, distance between a plurality of eNBs and the UE is obtained; a relative coordinate position of the UE relative to the eNBs is obtained by calculating according to a triangulation algorithm and the like, and then the network can obtain an absolute position of the UE according to actual positions of the eNBs. However, since the UTDOA positioning method adopts an estimation of the uplink positioning signal of the UE, it is restricted by the uplink transmit power of the UE; since the uplink transmit power of the UE is limited, the cover range of the positioning signal emitted by the UE is also limited, therefore, the number of the eNBs which performs the UTDOA positioning for the UE is restricted and, thus, the positioning precision of the UTDOA is restricted. Meanwhile, the UTDOA is also a positioning algorithm based on an estimation of the signal arrival time, hence, if the positioning signal is sheltered or reflected, the signal arrival time will be affected, thereby affecting the positioning precision.

The principle of the OTDOA positioning method is that, when there are three or more base stations existing in a system, position of a UE can be determined according to time difference of arrival of downlink transmission signals from different base stations. The downlink transmission signals may be positioning reference signals, and may also be synchronization signals. As known from the definition of a hyperbola, the hyperbola is constituted by points satisfying the condition as following: distance difference from the points to two specified points is a constant value. As shown in FIG. 1, in the system, there are a base station 0, a base station 1 and a base station 2, assuming that the black filled portion in FIG. 1 indicates the position of the UE, points which satisfy that distance difference from the UE to the base station 0 and the base station 1 is $d_1-d_0$ form one hyperbola, and points which satisfy that distance difference from the UE to the base station 1 and the base station 2 is $d_2-d_1$ form the other hyperbola, then, the crossover point of the two hyperbolas is namely the position of the UE. The more the number of base stations existing in the system, the more accurately the determined position of the UE. In the LTE, the OTDOA positioning is used as a technique where the network assists the positioning of the UE, at the network side, after an enhanced serving mobile location centre (e-SMLC) assigns transmit configuration and receive configuration of a positioning reference signal (PRS) for a base station and a mobile station, the base station sends the PRS to the mobile station, after receiving the PRSs from a plurality of base stations, the mobile station recognizes the first arrival path position of each of the PRSs and, thus, can obtain time difference of arrival of the PRSs among different base stations, and then report the time difference to the e-SMLC. The e-SMLC can obtain the distance difference from the mobile station to different base stations according to the received time difference of arrival of the PRSs. By means of the mathematical computation of the foregoing hyperbolic model, the e-SMLC can obtain an accurate position of the mobile station. It is thus clear that the precision of the OTDOA positioning is dependent on the receiving of the PRS signals and the estimation of the first arrival path position to a great extent, therefore, in scenes of a dense urban area, the path of the PRS is not a straight path due to multiple reflections, refractions and attenuations of a signal caused by obstructions from buildings, if an estimation of the position of the mobile station is still performed according to the time difference of arrival of the PRSs, a great positioning error will be brought.

SUMMARY

Embodiments of the present invention provide a network positioning method and related equipments, which are used for improving the network positioning precision.

In order to solve the technical problem above, embodiments of the present invention provide the following technical solutions:

A network positioning method, including:

receiving, by a user equipment (UE), positioning signals of at least three positioning nodes, where the at least three positioning nodes include at least one auxiliary UE, where the auxiliary UE is located within an end-to-end communication range of the UE, and valid position information of the auxiliary UE exists currently;

measuring the positioning signals of the at least three positioning nodes, and acquiring a measurement result which includes time difference of receiving the positioning signals of the at least three positioning nodes by the UE; and calculating, a current position of the UE according to the measurement result and the valid position information of the at least three positioning nodes.

A network positioning method, including:

acquiring, by a positioning device, a measurement result of a user equipment (UE), where the measurement result is obtained by the UE by measuring received positioning signals of at least three positioning nodes, where the measurement result includes time difference of receiving the positioning signals of the at least three positioning nodes by the UE, where the at least three positioning nodes include at least one auxiliary UE, the auxiliary UE is located within an end-to-end communication range of the UE, and valid position information of the auxiliary UE exists currently; and calculating, a current position of the UE according to the acquired measurement result and the valid position information of the at least three positioning nodes.

A network positioning method, including:

acquiring, by a positioning device, measurement results of at least three positioning nodes, where the measurement results are obtained by the at least three positioning nodes by respectively measuring a positioning signal sent by a user equipment (UE), and the measurement results include time of respectively receiving the positioning signal of the UE by the at least three positioning nodes, where the at least positioning nodes include at least one auxiliary UE, where the auxiliary UE is located within an end-to-end communication range of the UE, and valid position information of the auxiliary UE exists currently; and calculating, a current position of the UE according to the acquired measurement results and the valid position information of the at least three positioning nodes.

A user equipment UE, including:

a receiving unit, configured to receive positioning signals of at least three positioning nodes, where the at least three positioning nodes include at least one auxiliary UE, where the auxiliary UE is located within an end-to-end communication range of the UE, and valid position information of the auxiliary UE exists currently;

a measurement acquiring unit, configured to measure the positioning signals of the at least three positioning nodes, and acquire a measurement result which includes time difference of receiving the positioning signals of the at least three positioning nodes by the UE; and a calculating unit, configured to calculate a current position of the UE according to the measurement result and the valid position information of the at least three positioning nodes.

A positioning device, including:

an acquiring unit, configured to acquire a measurement result of a user equipment (UE), where the measurement result is obtained by the UE by measuring received positioning signals of at least three positioning nodes, the measurement result includes time difference of receiving the positioning signals of the at least three positioning nodes by the UE, the at least three positioning nodes include at least one auxiliary UE, the auxiliary UE is located within an end-to-end communication range of the UE, and valid position information of the auxiliary UE exists currently; and a calculating unit, configured to calculate a current position of the UE according to the measurement result acquired by the acquiring unit and the valid position information of the at least three positioning nodes.

A positioning device, including:

an acquiring unit, configured to acquire measurement results of at least three positioning nodes, where the measurement results are obtained by the at least three positioning nodes by respectively measuring a positioning signal sent by a user equipment (UE), the measurement results include time of respectively receiving the positioning signal of the UE by the at least three positioning nodes, the at least positioning nodes include at least one auxiliary UE, the auxiliary UE is located within an end-to-end communication range of the UE, and valid position information of the auxiliary UE exists currently; and a calculating unit, configured to calculate a current position of the UE according to the measurement results acquired by the acquiring unit and the valid position information of the at least three positioning nodes.

As can be seen from the above, in embodiments of the present invention, other UEs within an end-to-end communication range of a UE and of which the valid position information exists are taken as auxiliary UEs of the UE for positioning, since the distance between UEs within the end-to-end range is relative short, thus a positioning error due to multiple reflections, refractions and attenuations of a signal caused by obstructions from buildings can be avoided, thereby improving the network positioning precision efficiently.

BRIEF DESCRIPTION OF DRAWINGS

In order to make the technical solutions in embodiments of the present invention or in the prior art more clear, the accompanying drawings used in the description of embodiments of the present invention or the prior art are briefly described hereunder. Obviously, the described drawings are merely some embodiments of present invention. For persons skilled in the art, other drawings may be obtained based on these drawings without any creative efforts.

DESCRIPTION OF EMBODIMENTS

Embodiments of the present invention provide a network positioning method and related equipments.

In order to make the objectives, features, and advantages of embodiments of the present invention more clear and understandable, the technical solutions in embodiments of the present invention are hereinafter described clearly and completely with reference to the accompanying drawings in embodiments of the present invention. Obviously, the described embodiments are only a part of embodiments of the present invention, rather than all embodiments of the present invention. All the other embodiments obtained by persons of ordinary skill in the art based on embodiments of the present invention without any creative efforts shall fall within the protection scope of the present invention.

Figure 1:
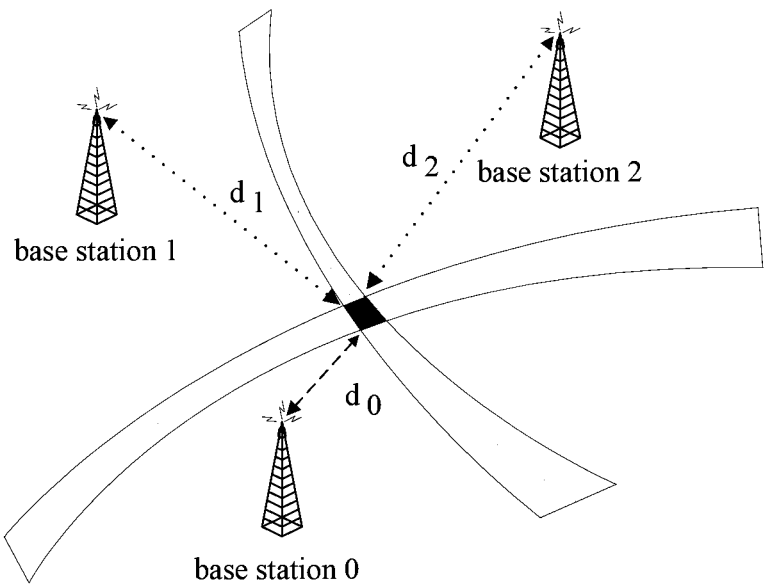
FIG. 1 is a schematic diagram of system principles of an OTDOA positioning method according to the present invention.
Figure 2:
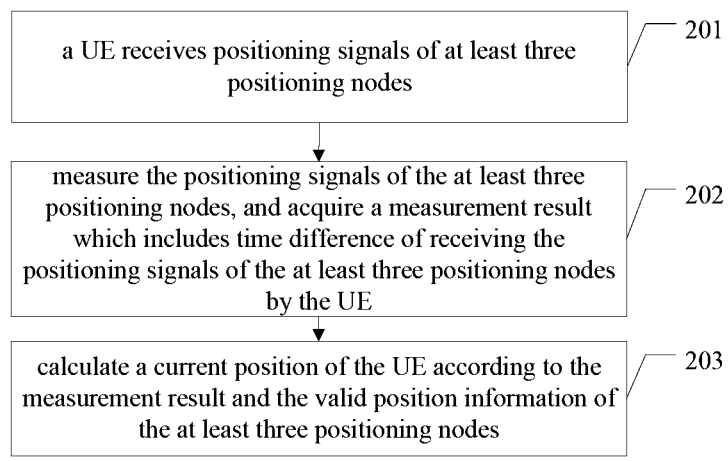
FIG. 2 is a schematic flow chart of a network positioning method according to an embodiment of the present invention.

A network positioning method provided by embodiments of the present invention will be described hereunder, the network positioning method in the embodiments of the present invention adopts an end-to-end downlink positioning manner, where a position of a UE is calculated by the UE itself, as shown in FIG. 2, a network positioning method according to embodiments of the present invention includes:

201, a UE receives positioning signals of at least three positioning nodes;

In embodiments of the present invention, the UE receives positioning signals of at least three positioning nodes, where the positioning signals may be positioning reference signals, and may also be synchronization signals, and are not limited thereto. The at least three positioning nodes include at least one auxiliary UE, where the auxiliary UE is located within an end-to-end communication range of the UE, and valid position information of the auxiliary UE exists currently.

The end-to-end communication (i.e. D2D) is an effective communication mode, communications between UEs can be performed directly without forwarding by a base station, however, since the transmit power of the source UE itself is limited, and reception capacity of the target UE, i.e. signal reception sensitivity, is also limited, therefore, the end-to-end communication distance is limited. In embodiments of the present invention, the end-to-end communication distance is called as an end-to-end communication range, i.e. effective distance of the end-to-end communication, generally, the end-to-end communication range is relative small, e.g., may be within 50 meters.

In embodiments of the present invention, the valid position information refers to the position information satisfies that: an interval between a positioning time (i.e. a time when the position information is acquired) and a current time is within a specified time range, and all position information satisfies that the interval between the positioning time and the current time exceeds the specified time range is regarded as invalid position information, where the above time range may be a parameter configured by a network side. The valid position information of the above auxiliary UE may be obtained through a GPS, or may also be obtained through a network positioning manner, which is not limited herein.

In an application scenario, when a UE performs the positioning, the UE firstly judges whether none of valid position information of all other UEs within the end-to-end communication range of the UE exists, if not, then selects the other UEs of which the valid position information exists, as an auxiliary UE set. For example, assuming that the UE in embodiments of the present invention is a UE1, UEs which can perform the end-to-end communication with the UE1 include a UE2, a UE3 and a UE4, i.e. the UE2, the UE3 and the UE4 exist within the end-to-end communication range of the UE1; and assuming that only the valid position information of the UE2 and the UE3 exists, then the UE1 selects the UE2 and the UE3 as the auxiliary UE set. If none of valid position information of all other UEs within the end-to-end communication range of the UE exists, then this positioning procedure is ended, or other network positioning manners such as the UTDOA and the OTDOA may be adopted for positioning, which will not be limited herein. Furthermore, when the auxiliary UE set of the UE exists, the UE judges whether a local end-to-end communication range is less than a preset range, where the preset range is a threshold value set by a network side according to requirements for the positioning precision of a network. If the local end-to-end communication range of the UE is less than the preset range, then it is deemed that distance between an auxiliary UE in the auxiliary UE set and the UE is less than a positioning error required by the network, at this time, the UE may select an auxiliary UE from the auxiliary UE set, and take the valid position information of the selected auxiliary UE as the valid position information of the UE, where, the manner of selecting the auxiliary UE from the auxiliary UE set, for example, may be selecting an auxiliary UE of which the signal strength is strongest from the auxiliary UE set; or, may also be randomly selecting an auxiliary UE from the auxiliary UE set. Certainly, when the local end-to-end communication range of the UE is less than the preset range, the UE may also take centroids of position coordinates of all auxiliary UEs in the auxiliary UE set, and take obtained centroid coordinates as the valid position information of the UE, which will not be limited herein.

In embodiments of the present invention, before performing step 201, the UE needs to send positioning signal configuration information to the auxiliary UE in the at least three positioning nodes, so that the auxiliary UE in the at least three positioning nodes sends a positioning signal to the UE according to transmit time and a transmit format specified by the received positioning signal configuration information. In addition, other devices such as a base station in the at least three positioning nodes, may send a positioning signal to the UE according to downlink positioning techniques such as the OTDOA.

202, measure the positioning signals of the at least three positioning nodes, and acquire a measurement result which includes time difference of receiving the positioning signals of the at least three positioning nodes by the UE;

The UE measures the received at least three positioning signals, and obtains a measurement result, where the measurement result includes time difference of receiving the positioning signals of the at least three positioning nodes.

203, calculate a current position of the UE according to the measurement result and the valid position information of the at least three positioning nodes;

The UE calculates its own current position according to the time difference of receiving the positioning signals of the at least three positioning nodes and the valid position information of the at least three positioning nodes.

As can be seen from the above, in embodiments of the present invention, other UEs within an end-to-end communication range of a UE and of which the valid position information exists are taken as auxiliary UEs of the UE for positioning, since the distance between UEs within the end-to-end range is relative short, thus a positioning error due to multiple reflections, refractions and attenuations of a signal caused by obstructions from buildings can be avoided, thereby improving the network positioning precision efficiently.

Figure 3:
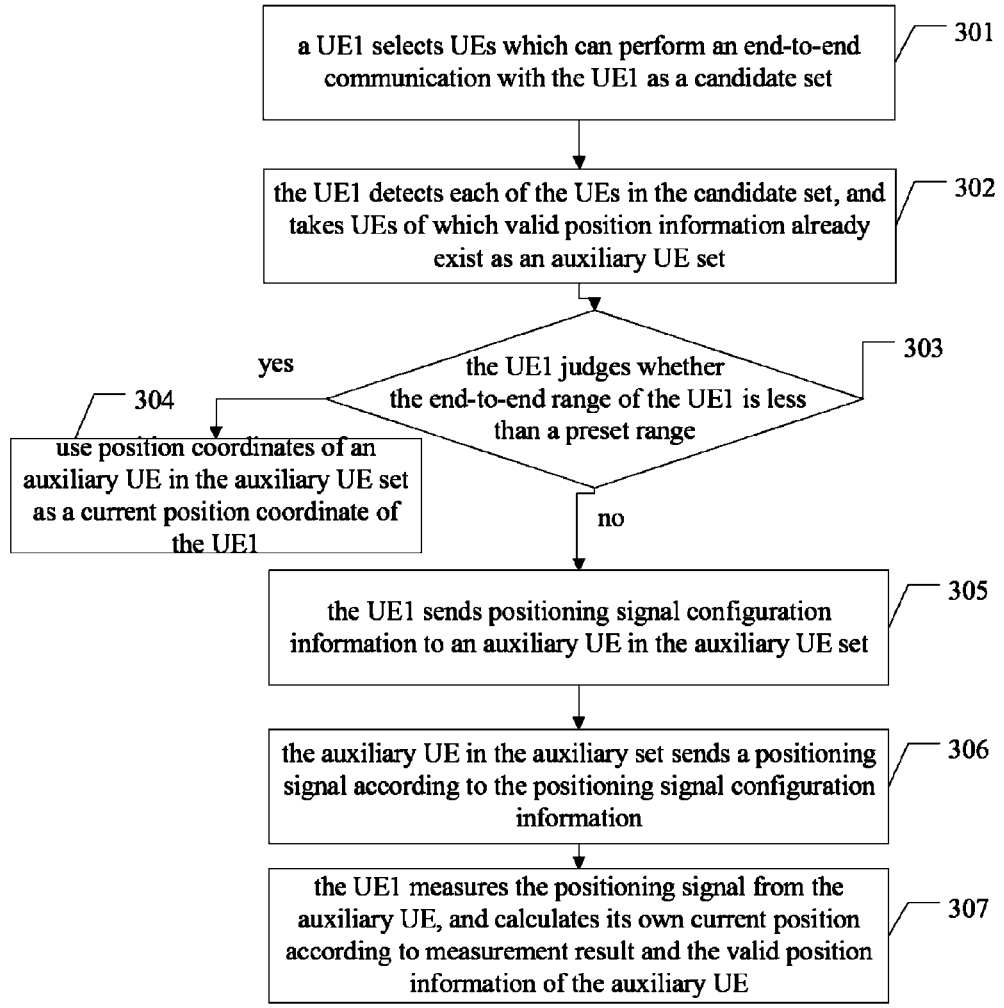
FIG. 3 is a schematic flow chart of a network positioning method according to another embodiment of the present invention.

To facilitate a better understanding of technical solutions in the present invention, the following takes a specific application scenario is taken and describes the network positioning method being performed by a UE for downlink positioning according to an embodiment of the present invention, as shown in FIG. 3, the method includes:

301, a UE1 selects UEs which can perform an end-to-end communication with the UE1 as a candidate set;

That is, the UEs in the candidate set are within the end-to-end range of the UE1.

302, the UE1 detects each of the UEs in the candidate set, and takes UEs of which valid position information already exist as an auxiliary UE set;

Embodiments of the present invention is applied to the scenario that the candidate set includes the UE of which valid position information already exist, certainly, the candidate set may also do not include the UE of which valid position information already exist, then this positioning procedure may be ended, or other network positioning manners such as the UTDOA and the OTDOA, may be adopted for positioning.

303, the UE1 judges whether the end-to-end range of the UE1 is less than a preset range;

The preset range indicates requirements for the positioning precision of a network, which is configured by the network side.

If it is less than the preset range, then step 304 is performed, if it is greater than the preset range, then step 305 is performed.

304, use position coordinates of an auxiliary UE in the auxiliary UE set as a current position coordinate of the UE1;

If it is judged that the end-to-end range of the UE1 is less than the preset range in step 303, then it means that distance between a UE, which can perform the end-to-end communication with the UE1 and is in the auxiliary UE set, and the UE1 is less than a positioning error required by the network, and the auxiliary UE in the auxiliary UE set already has the valid position information, hence the position coordinate of the auxiliary UE in the auxiliary UE set may be taken as the current position coordinate of the UE1 directly. Specifically, the method for selecting the position coordinate of which auxiliary UE in the auxiliary UE set as the current position coordinate of the UE1 may be: selecting, from the auxiliary UE set, a position coordinate of an auxiliary UE of which the signal strength received by the UE1 as the current position coordinate of the UE1; or, may also be randomly selecting, from the auxiliary UE set, a position coordinate of an auxiliary UE as the current position coordinate of the UE1. Currently, the UE1 may also take centroids of position coordinates of all auxiliary UEs in the auxiliary UE set, and take obtained centroid coordinates as the current position coordinate of the UE1, which will not be limited herein.

305, the UE1 sends positioning signal configuration information to an auxiliary UE in the auxiliary UE set;

The positioning signal configuration information may be sent to the auxiliary UE in the auxiliary UE set by the UE1 via a UE-UE signaling.

306, the auxiliary UE in the auxiliary set sends a positioning signal according to the positioning signal configuration information;

After receiving the positioning signal configuration information, the auxiliary UE in the auxiliary set sends the positioning signal according to transmit time and a transmit format specified in the positioning signal configuration information, so that the UE1 can open a search window around a corresponding moment, search the positioning signal sent by the auxiliary UE in the auxiliary set, and prepare a local sequence for decoding according to the transmit format.

307, the UE1 measures the positioning signal from the auxiliary UE, and calculates its own current position according to measurement result and the valid position information of the auxiliary UE;

When positioning nodes measured by the UE1 are more than or equal to three, the current position of the UE1 may be determined according to time difference of arrival of positioning signals of different reference points and the valid position information of each positioning node, where the time difference of arrival is obtained by measuring.

In embodiments of the present invention, illustrations are made based on an example where the number of auxiliary UEs in the auxiliary set is more than or equal to 3, therefore, in step 307, only the positioning signals from the auxiliary UEs in the auxiliary set need to be measured, then the current position of the UE1 itself can be determined.

In an actual application, if auxiliary UEs in the auxiliary set are more than 1 but less than 3, in step 307, the UE1 also measures a positioning signal from a base station, and calculates its own current position according to the measurement result, and valid position information of the base station and of the auxiliary UEs.

As can be seen from the above, in embodiments of the present invention, other UEs within an end-to-end communication range of a UE and of which the valid position information exists are taken as auxiliary UEs of the UE for positioning, since the distance between UEs within the end-to-end range is relative short, thus a positioning error due to multiple reflections, refractions and attenuations of a signal caused by obstructions from buildings can be avoided, thereby improving the network positioning precision efficiently.

Figure 4:
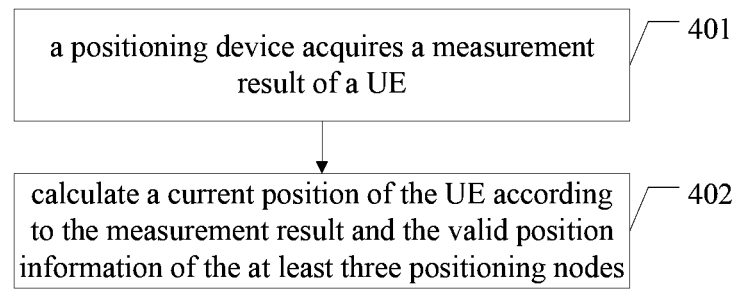
FIG. 4 is a schematic flow chart of a network positioning method according to still another embodiment of the present invention.

A network positioning method provided by embodiments of the present invention will be described hereunder, the network positioning method in the embodiments of the present invention adopts an end-to-end downlink positioning manner, and where a position of the UE1 is calculated by a positioning device (e.g., a positioning server or a base station), as shown in FIG. 4, a network positioning method according to embodiments of the present invention includes:

401, a positioning device acquires a measurement result of a UE;

In embodiments of the present invention, the positioning device acquires the measurement result of the UE, where the measurement result is acquired by the UE by measuring received positioning signals (may be positioning reference signals, and may also be synchronization signals) of at least three positioning nodes, and where the measurement result includes time difference of receiving the positioning signals of the at least three positioning nodes by the UE, the at least three positioning nodes include at least one auxiliary UE, the auxiliary UE is located within an end-to-end communication range of the UE, and valid position information of the auxiliary UE exists currently.

In embodiments of the present invention, the valid position information refers to the position information satisfies that: an interval between a positioning time (i.e. a time when the position information is acquired) and a current time is within a specified time range, and all position information satisfies that the interval between the positioning time and the current time exceeds the specified time range is regarded as invalid position information, where the above time range may be a parameter configured by a network side. The valid position information of the above auxiliary UE may be obtained through a GPS, or may also be obtained through a network positioning manner, which is not limited herein.

In an application scenario, when performing a positioning to the UE, the positioning device firstly judges whether none of valid position information of all other UEs within the end-to-end communication range of the UE exists, if not, then selects the other UEs of which the valid position information exists as an auxiliary UE set of the UE. For example, assuming that the UE in embodiments of the present invention is a UE1, UEs which can perform the end-to-end communication with the UE1 include a UE2, a UE3 and a UE4, i.e. the UE2, the UE3 and the UE4 exist within the end-to-end communication range of the UE1; and assuming that only the valid position information of the UE2 and the UE3 exists, then the positioning device selects the UE2 and the UE3 as the auxiliary UE set of the UE1. If none of valid position information of all other UEs within the end-to-end communication range of the UE exists, then this positioning procedure is ended, or other network positioning manners such as the UTDOA and the OTDOA may be adopted for positioning, which will not be limited herein. Furthermore, when the auxiliary UE forest of the UE exists, the positioning device judges whether the end-to-end communication range of the UE is less than a preset range, where the preset range is a threshold value set by a network side according to requirements for the positioning precision of a network. If an local end-to-end communication range of the UE is less than the preset range, then it is deemed that distance between an auxiliary UE in the auxiliary UE set of the UE and the UE is less than a positioning error required by the network, at this time, the positioning device may select an auxiliary UE from the auxiliary UE set of the UE, and take the valid position information of the selected auxiliary UE as the valid position information of the UE, where, the manner of selecting the auxiliary UE from the auxiliary UE set of the UE, for example, may be selecting an auxiliary UE of which the signal strength is strongest from the auxiliary UE set of the UE; or, may also be randomly selecting an auxiliary UE from the auxiliary UE set of the UE. Certainly, when the end-to-end communication range of the UE is less than the preset range, the positioning device may also take centroids of position coordinates of all auxiliary UEs in the auxiliary UE set of the UE, and take obtained centroid coordinates as the valid position information of the UE, which will not be limited herein.

In embodiments of the present invention, before performing step 401, the positioning device also needs to send positioning signal configuration information to the UE and the auxiliary UE in the at least three positioning nodes, so that the auxiliary UE in the at least three positioning nodes sends a positioning signal to the UE according to transmit time and a transmit format specified by the received positioning signal configuration information, and the UE receives the positioning signal of the auxiliary UE according to the transmit time and the transmit format specified by the received positioning signal configuration information. The positioning device may send the positioning signal configuration information to the auxiliary UE in the at least three positioning nodes directly, and may also send the positioning signal configuration information to the auxiliary UE in the at least three positioning nodes through the UE, which will not be limited herein.

In embodiments of the present invention, other devices, such as a base station, in the at least three positioning nodes may send the positioning signal to the UE according to downlink positioning techniques such as the OTDOA.

402, calculate a current position of the UE according to the measurement result and the valid position information of the at least three positioning nodes.

The positioning device calculates the current position of the UE according to the time difference of receiving the positioning signals of the at least three positioning nodes by the UE, which is included in the measurement result acquired in step 401, and the valid position information of the at least three positioning nodes.

In embodiments of the present invention, the positioning device, for example, may be a positioning server or a base station. If the positioning device is the positioning server, then the interactions between the positioning server and the UE and the auxiliary UE may be realized based on a long term evolution positioning protocol (LPP) signaling, and the interaction between the positioning server and a base station (e.g., an eNB) may be performed based on a LTE positioning protocol A (i.e. LPPa) signaling; if the positioning device is the base station, then the interactions between the base station and the UE and the auxiliary UE may be realized based on a radio resource control (RRC) signaling.

As can be seen from the above, in embodiments of the present invention, other UEs within an end-to-end communication range of a UE and of which the valid position information exists are taken as auxiliary UEs of the UE for positioning, since the distance between UEs within the end-to-end range is relative short, thus a positioning error due to multiple reflections, refractions and attenuations of a signal caused by obstructions from buildings can be avoided, thereby improving the network positioning precision efficiently.

Figure 5:
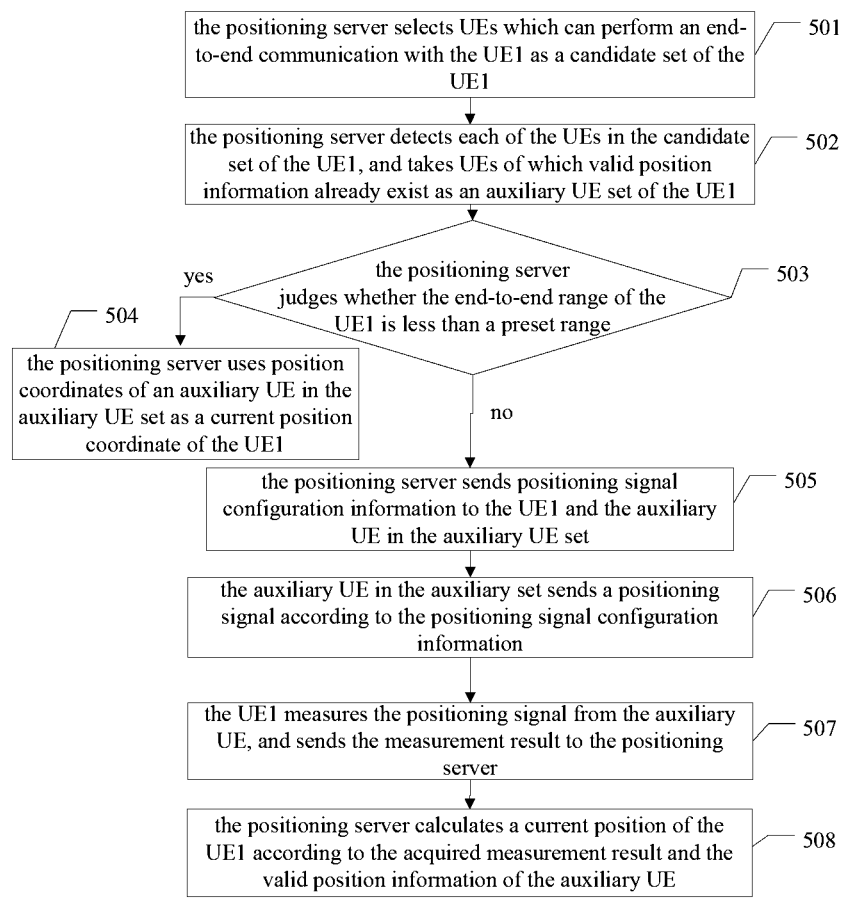
FIG. 5 is a schematic flow chart of a network positioning method according to still another embodiment of the present invention.

To facilitate a better understanding of technical solutions in the present invention, the following takes a specific application scenario is taken and describes the the network positioning method being performed by the positioning server for downlink positioning according to an embodiment of the present invention, as shown in FIG. 5, the method includes:

501, the positioning server selects UEs which can perform an end-to-end communication with the UE1 as a candidate set of the UE1;

That is, the UEs in the candidate set are within the end-to-end range of the UE1.

502, the positioning server detects each of the UEs in the candidate set of the UE1, and takes UEs of which valid position information already exist as an auxiliary UE set of the UE1;

Embodiments of the present invention is applied to the scenario that the candidate set includes the UE of which valid position information already exist, certainly, the candidate set may also do not include the UE of which valid position information already exist, then this positioning procedure may be ended, or other network positioning manners such as the UTDOA and the OTDOA, may be adopted for positioning.

503, the positioning server judges whether the end-to-end range of the UE1 is less than a preset range;

The preset range indicates requirements for the positioning precision of a network, which is configured by the network side.

If it is less than the preset range, then step 504 is performed, if it is greater than the preset range, then step 505 is performed.

504, the positioning server uses position coordinates of an auxiliary UE in the auxiliary UE set as a current position coordinate of the UE1;

If it is judged that the end-to-end range of the UE1 is less than the preset range in step 503, then it means that distance between a UE, which can perform the end-to-end communication with the UE1 and is in the auxiliary UE set, and the UE1 is less than a positioning error required by the network, and the auxiliary UE in the auxiliary UE set already has the valid position information, hence the positioning server may directly take the position coordinate of the auxiliary UE in the auxiliary UE set as the current position coordinate of the UE1. Specifically, the method for selecting the position coordinate of which auxiliary UE in the auxiliary UE set as the current position coordinate of the UE1 may be: selecting, by the positioning server and from the auxiliary UE set, a position coordinate of an auxiliary UE of which the signal strength received by the UE1 as the current position coordinate of the UE1; or, may also be randomly selecting, by the positioning server and from the auxiliary UE set, a position coordinate of an auxiliary UE as the current position coordinate of the UE1. Currently, the UE1 may also take centroids of position coordinates of all auxiliary UEs in the auxiliary UE set, and take obtained centroid coordinates as the current position coordinate of the UE1, which will not be limited herein.

505, the positioning server sends positioning signal configuration information to the UE1 and the auxiliary UE in the auxiliary UE set;

The positioning server may send the positioning signal configuration information to the UE1 and the auxiliary UE in the auxiliary UE set directly, and may also send the positioning signal configuration information to the auxiliary UE in the auxiliary UE set of the UE1 via the UE1. In embodiments of the present invention, the positioning server may transmit the positioning signal configuration information to the UE1 and the auxiliary UE by adopting an LLP signaling.

506, the auxiliary UE in the auxiliary set sends a positioning signal according to the positioning signal configuration information;

After receiving the positioning signal configuration information, the auxiliary UE in the auxiliary set sends the positioning signal according to the transmit time and the transmit format specified in the positioning signal configuration information.

507, the UE1 measures the positioning signal from the auxiliary UE, and sends the measurement result to the positioning server;

The UE1 opens a search window around a corresponding moment according to the received positioning signal configuration information, searches the positioning signal sent by the auxiliary UE in the auxiliary set, and prepares a local sequence for decoding according to the transmit format.

In embodiments of the present invention, illustrations are made based on an example where the number of auxiliary UEs in the auxiliary set is more than or equal to 3, therefore, in step 507, only need to measure positioning signals from the auxiliary UEs in the auxiliary set, and send the measurement result to the positioning server.

In an actual application, if auxiliary UEs in the auxiliary set are more than 1 but less than 3, in step 507, the UE1 also measure a positioning signal from a base station, and then the measurement result reported by the UE1 to the positioning server includes the measurement result performed by the UE1 to the base station.

508, the positioning server calculates a current position of the UE1 according to the acquired measurement result and the valid position information of the auxiliary UE.

In an actual application, if auxiliary UEs in the auxiliary set are more than 1 but less than 3, when calculating the current position of the UE1 in step 508, the valid position information of the base station measured by the UE1 in step 507 also needs to be combined.

Embodiments of the present invention employ a positioning server as a positioning device of the UE1, certainly, a base station (e.g., an eNB) may also be utilized as a positioning device of the UE1, for the procedure thereof, reference may be made to descriptions in FIG. 5 (replacing the positioning server with the base station), it can be understandable that, in the replaced solution, the base station may adopt a RRC signaling to transmit positioning signal configuration information to the UE1 and the auxiliary UE.

As can be seen from the above, in embodiments of the present invention, other UEs within an end-to-end communication range of a UE and of which the valid position information exists are taken as auxiliary UEs of the UE for positioning, since the distance between UEs within the end-to-end range is relative short, thus a positioning error due to multiple reflections, refractions and attenuations of a signal caused by obstructions from buildings can be avoided, thereby improving the network positioning precision efficiently.

Figure 6:
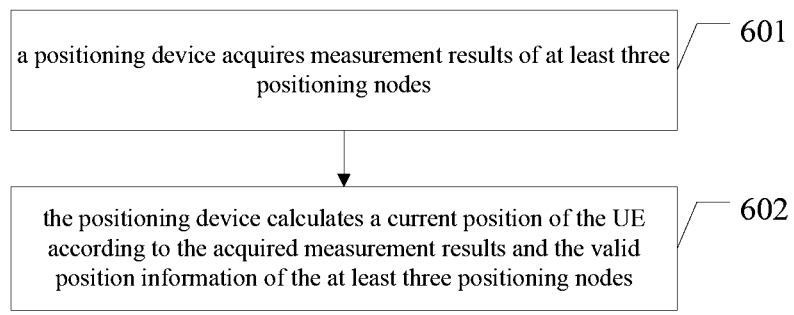
FIG. 6 is a schematic flow chart of a network positioning method according to still another embodiment of the present invention.

A network positioning method provided by embodiments of the present invention will be described hereunder, the network positioning method in the embodiments of the present invention adopts an end-to-end uplink positioning manner, and where a position of a UE is calculated by a positioning device (which may be the UE itself), as shown in FIG. 6, a network positioning method according to embodiments of the present invention includes:

601, a positioning device acquires measurement results of at least three positioning nodes;

In embodiments of the present invention, a positioning device acquires measurement results of at least three positioning nodes, where the measurement results are obtained by the at least three positioning nodes by respectively measuring a positioning signal (which may be a positioning reference signal, and may also be a synchronization signal) sent by a UE, and the measurement results include time of respectively receiving the positioning signal of the UE by the at least three positioning nodes, where the at least positioning node include at least one auxiliary UE, the auxiliary UE is located within an end-to-end communication range of the UE, and valid position information of the auxiliary UE exists currently.

In embodiments of the present invention, the valid position information refers to the position information satisfies that: an interval between a positioning time (i.e. a time when the position information is acquired) and a current time is within a specified time range, and all position information satisfies that the interval between the positioning time and the current time exceeds the specified time range is regarded as invalid position information, where the above time range may be a parameter configured by a network side. The valid position information of the above auxiliary UE may be obtained through a GPS, or may also be obtained through a network positioning manner, which is not limited herein.

In an application scenario, when performing a positioning to the UE, the positioning device firstly judges whether none of valid position information of all other UEs within the end-to-end communication range of the UE exists, if not, then selects the other UEs of which the valid position information exists as an auxiliary UE set of the UE. If none of valid position information of all other UEs within the end-to-end communication range of the UE exists, then this positioning procedure is ended or other network positioning manners such as the UTDOA and the OTDOA is adopted for positioning, which will not be limited herein. Furthermore, when the auxiliary UE forest of the UE exists, the positioning device judges whether the end-to-end communication range of the UE is less than a preset range, where the preset range is a threshold value set by a network side according to requirements for the positioning precision of a network. If an local end-to-end communication range of the UE is less than the preset range, then it is deemed that distance between an auxiliary UE in the auxiliary UE set of the UE and the UE is less than a positioning error required by the network, at this time, the positioning device may select an auxiliary UE from the auxiliary UE set of the UE, and take the valid position information of the selected auxiliary UE as the valid position information of the UE, where, the manner of selecting the auxiliary UE from the auxiliary UE set of the UE, for example, may be selecting an auxiliary UE of which the signal strength is strongest from the auxiliary UE set of the UE; or, may also be randomly selecting an auxiliary UE from the auxiliary UE set of the UE. Certainly, when the end-to-end communication range of the UE is less than the preset range, the positioning device may also take centroids of position coordinates of all auxiliary UEs in the auxiliary UE set of the UE, and take obtained centroid coordinates as the valid position information of the UE, which will not be limited herein.

In embodiments of the present invention, before performing step 601, the positioning device also needs to send positioning signal configuration information of the UE to the auxiliary UE in the at least three positioning nodes, so that the auxiliary UE in the at least three positioning nodes receives the positioning signal sent by the UE according to transmit time and a transmit format specified by the received positioning signal configuration information. After measuring the positioning signal received from the UE, the at least three positioning nodes estimate a time of receiving the positioning signal of the UE, and send measurement results including the time to the positioning device.

In embodiments of the present invention, other devices, such as base stations, in the at least three positioning nodes may receive and estimate the positioning signal of the UE according to uplink positioning techniques such as the UTDOA.

602, the positioning device calculates a current position of the UE according to the acquired measurement results and the valid position information of the at least three positioning nodes;

In embodiments of the present invention, if the at least three positioning nodes include a serving base station of the UE and other base stations, then the positioning device sends the positioning signal configuration information of the UE to the serving base station of the UE, and the serving base station of the UE sends the positioning signal configuration information of the UE to other base stations via X2 interfaces with other base stations; or, if the positioning device is a positioning server, then the positioning server may also send the positioning signal configuration information of the UE to the serving base station of the UE and other base stations directly, which will not be limited herein.

In embodiments of the present invention, the positioning device, for example, may be a UE, a positioning server or a base station. If the positioning device is the UE, then the interaction between the UE and an auxiliary UE may be realized based on a UE-UE signaling, and the interaction between the UE and the base station may be realized through an RRC signaling; if the positioning device is the positioning server, then the interactions between the positioning server and the UE and the auxiliary UE may be realized based on an LPP signaling, and the interaction between the positioning server and a base station (e.g., an eNB) may be performed based on an LPPa signaling; if the positioning device is the base station, then the interactions between the base station and the UE and the auxiliary UE may be realized through an RRC signaling.

As can be seen from the above, in embodiments of the present invention, other UEs within an end-to-end communication range of a UE and of which the valid position information exists are taken as auxiliary UEs of the UE for positioning, since the distance between UEs within the end-to-end range is relative short, thus a positioning error due to multiple reflections, refractions and attenuations of a signal caused by obstructions from buildings can be avoided, thereby improving the network positioning precision efficiently.

Figure 7:
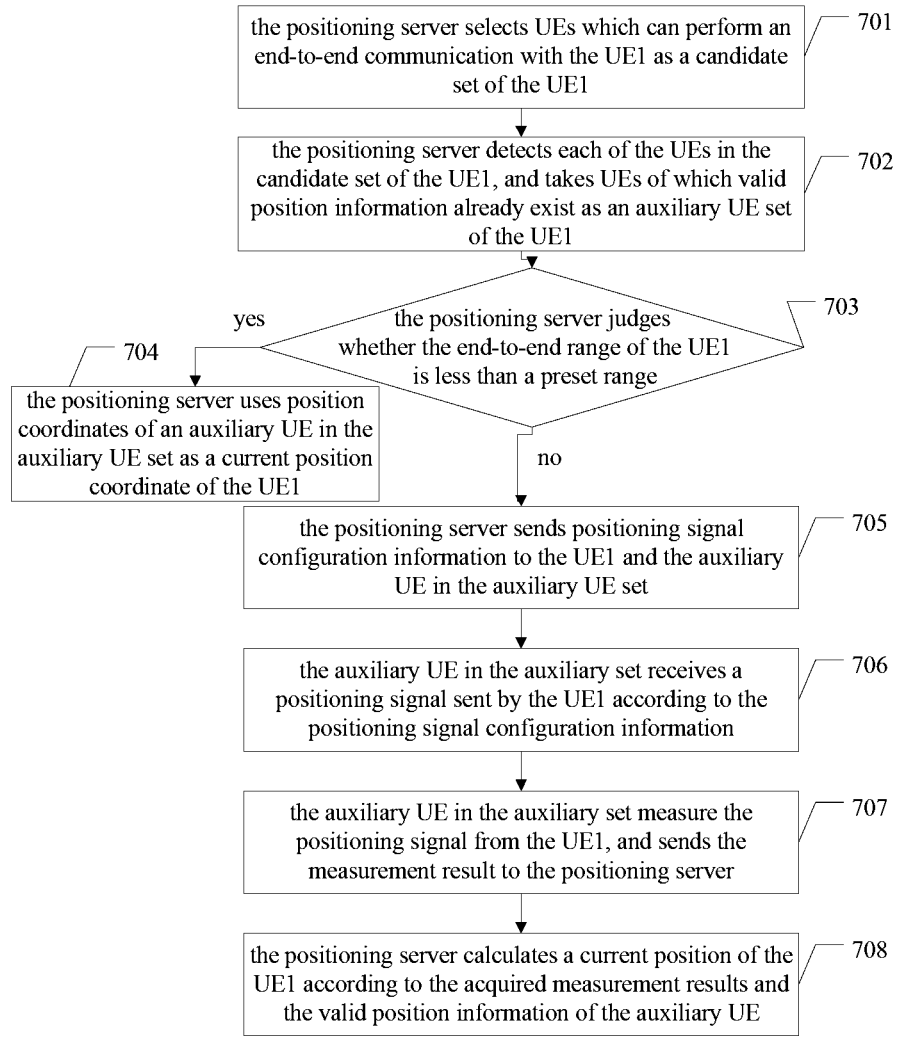
FIG. 7 is a schematic flow chart of a network positioning method according to still another embodiment of the present invention.

To facilitate a better understanding of technical solutions in the present invention, the following takes a specific application scenario is taken and describes the the network positioning method being performed by the positioning server for uplink positioning according to an embodiment of the present invention, as shown in FIG. 7, the method includes:

701, the positioning server selects UEs which can perform an end-to-end communication with the UE1 as a candidate set of the UE1;

That is, the UEs in the candidate set are within the end-to-end range of the UE1.

702, the positioning server detects each of the UEs in the candidate set of the UE1, and takes UEs of which valid position information already exist as an auxiliary UE set of the UE1;

Embodiments of the present invention is applied to the scenario that the candidate set includes the UE of which valid position information already exist, certainly, the candidate set may also do not include the UE of which valid position information already exist, then this positioning procedure may be ended, or other network positioning manners such as the UTDOA and the OTDOA, may be adopted for positioning.

703, the positioning server judges whether the end-to-end range of the UE1 is less than a preset range;

The preset range indicates requirements for the positioning precision of a network, which is configured by the network side.

If it is less than the preset range, then step 704 is performed, if it is greater than the preset range, then step 705 is performed.

704, the positioning server uses position coordinates of an auxiliary UE in the auxiliary UE set as a current position coordinate of the UE1;

If it is judged that the end-to-end range of the UE1 is less than the preset range in step 703, then it means that distance between a UE, which can perform the end-to-end communication with the UE1 and is in the auxiliary UE set, and the UE1 is less than a positioning error required by the network, and the auxiliary UE in the auxiliary UE set already has the valid position information, hence the positioning server may directly take the position coordinate of the auxiliary UE in the auxiliary UE set as the current position coordinate of the UE1. Specifically, the method for selecting the position coordinate of which auxiliary UE in the auxiliary UE set as the current position coordinate of the UE1 may be: selecting, by the positioning server and from the auxiliary UE set, a position coordinate of an auxiliary UE of which the signal strength received by the UE1 as the current position coordinate of the UE1; or, may also be randomly selecting, by the positioning server and from the auxiliary UE set, a position coordinate of an auxiliary UE as the current position coordinate of the UE1. Currently, the UE1 may also take centroids of position coordinates of all auxiliary UEs in the auxiliary UE set, and take obtained centroid coordinates as the current position coordinate of the UE1, which will not be limited herein.

705, the positioning server sends positioning signal configuration information to the UE1 and the auxiliary UE in the auxiliary UE set;

The positioning server may send the positioning signal configuration information to the UE1 and the auxiliary UE in the auxiliary UE set directly, and may also send the positioning signal configuration information of the UE1 to the auxiliary UE in the auxiliary UE set of the UE1 via the UE1. In embodiments of the present invention, the positioning server may transmit the positioning signal configuration information to the UE1 and the auxiliary UE by adopting an LLP signaling.

706, the auxiliary UE in the auxiliary set receives a positioning signal sent by the UE1 according to the positioning signal configuration information;

After receiving the positioning signal configuration information, the auxiliary UE in the auxiliary set receives the positioning signal of the UE1 according to the transmit time and the transmit format specified in the positioning signal configuration information.

707, the auxiliary UE in the auxiliary set measure the positioning signal from the UE1, and sends the measurement result to the positioning server;

The auxiliary UE in the auxiliary set opens a search window around a corresponding moment according to the received positioning signal configuration information of the UE1, searches the positioning signal sent by the UE1, and prepares a local sequence for decoding according to the transmit format.

The auxiliary UE in the auxiliary set measures the positioning signal from the UE1, estimates a time of receiving the positioning signal of the UE1, and sends measurement result including the time to the positioning server.

708, the positioning server calculates a current position of the UE1 according to the acquired measurement results and the valid position information of the auxiliary UE.

In embodiments of the present invention, illustrations are made based on an example where the number of auxiliary UEs in the auxiliary set is more than or equal to 3, in an actual application, if auxiliary UEs in the auxiliary set are more than 1 but less than 3, then a serving base station of the UE1 and other base stations are required to participate in the positioning of the UE1 so as to ensure positioning nodes are no less than 3.

Embodiments of the present invention employ a positioning server as the positioning device, certainly, a base station or the UE1 itself may also be utilized as a positioning device, for the procedure thereof, reference may be made to descriptions in FIG. 5 (replacing the positioning server with the base station or the UE1), it can be understood that, if the base station acts as the positioning device in the replaced solution, then the base station may adopt an RRC signaling to transmit the positioning signal configuration information of the UE1 to the auxiliary UEs, and transmit the positioning signal configuration information of the UE1 to other base stations via X2 interfaces (in an scenario that other base stations need to participate in positioning); if the UE1 acts as the positioning device in the replaced solution, then the UE1 may adopt a UE-UE signaling to transmit the positioning signal configuration information of the UE1 to the auxiliary UEs, and transmit the positioning signal configuration information of the UE1 to a serving base station via a RRC signaling (in an scenario that the serving base station needs to participate in positioning), or transmit the positioning signal configuration information of the UE1 to other base stations via X2 interfaces which connect a serving base station with other base stations (in an scenario that other base stations need to participate in positioning).

As can be seen from the above, in embodiments of the present invention, other UEs within an end-to-end communication range of a UE and of which the valid position information exists are taken as auxiliary UEs of the UE for positioning, since the distance between UEs within the end-to-end range is relative short, thus a positioning error due to multiple reflections, refractions and attenuations of a signal caused by obstructions from buildings can be avoided, thereby improving the network positioning precision efficiently.

Figure 8:
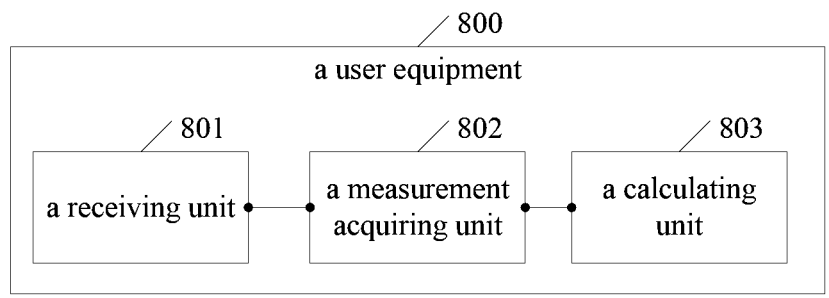
FIG. 8 is a schematic structural diagram of a user equipment according to an embodiment of the present invention.

The following describes a user equipment according to embodiments of the present invention, as shown in FIG. 8, a user equipment 800 in embodiments of the present invention includes:

a receiving unit 801, configured to receive positioning signals of at least three positioning nodes, where the at least three positioning nodes include at least one auxiliary UE, wherein the auxiliary UE is located within an end-to-end communication range of the user equipment 800, and valid position information of the auxiliary UE exists currently;

a measurement acquiring unit 802, configured to measure the positioning signals of the at least three positioning nodes received by the receiving unit 801, and acquire a measurement result which includes time difference of receiving the positioning signals of the at least three positioning nodes by the user equipment 800;

a calculating unit 803, configured to calculate a current position of the user equipment 800 according to the measurement result acquired by the measurement acquiring unit 802 and the valid position information of the at least three positioning nodes.

In an application scenario, the user equipment 800 further includes: a first judging unit and a selecting unit; where the first judging unit is configured to judge whether none of valid position information of all other UEs within the end-to-end communication range of the user equipment 800 exists; the selecting unit is configured to, when the judging result of the first judging unit is not, select the other UEs of which the valid position information exists as an auxiliary UE set. Furthermore, the user equipment 800 further includes: a second judging unit and a select positioning unit; where the second judging unit is configured to judge whether the local end-to-end communication range of the user equipment 800 is less than a preset range after the selecting unit is triggered, and the select positioning unit is configured to, when the judging result of the second judging unit is yes, select an auxiliary UE from the auxiliary UE set, take the valid position information of the selected auxiliary UE as the valid position information of the user equipment 800; or the select positioning unit may also, when the judging result of the second judging unit is yes, take centroids of position coordinates of all auxiliary UEs in the auxiliary UE set, and take the obtained centroid coordinates as the valid position information of the user equipment 800, which will not be limited herein. The receiving unit 801, the measurement acquiring unit 802 and the calculating unit 803 are triggered only when the judging result of the second judging unit is not.

In another application scenario, the user equipment 800 further includes a sending unit, configured to send positioning signal configuration information to the auxiliary UE in the at least three positioning nodes before the receiving unit 801 receives the positioning signals of the at least three positioning nodes, so that the auxiliary UE in the at least three positioning nodes sends a positioning signal to the user equipment 800 according to transmit time and a transmit format specified by the positioning signal configuration information.

It should be noted that, like the UE in the method embodiments above, the user equipment 800 in embodiments of the present invention may be used for implementing all technical solutions in the method embodiments described above, where functions of each of the functional modules thereof may be specifically implemented according to a method in the method embodiments described above, for details of the implementation procedure, reference may be made to relevant descriptions in the above method embodiments, which will not be limited herein.

As can be seen from the above, in embodiments of the present invention, other UEs within an end-to-end communication range of a UE and of which the valid position information exists are taken as auxiliary UEs of the UE for positioning, since the distance between UEs within the end-to-end range is relative short, thus a positioning error due to multiple reflections, refractions and attenuations of a signal caused by obstructions from buildings can be avoided, thereby improving the network positioning precision efficiently.

Figure 9:
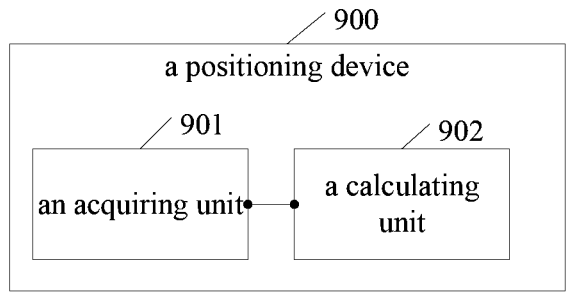
FIG. 9 is a schematic structural diagram of a positioning device according to an embodiment of the present invention.

The following describes a positioning device according to embodiments of the present invention, as shown in FIG. 9, a positioning device 900 in embodiments of the present invention includes:

an acquiring unit 901, configured to acquire a measurement result of a UE, where the measurement result is obtained by the UE by measuring received positioning signals of at least three positioning nodes, the measurement result comprises time difference of receiving the positioning signals of the at least three positioning nodes by the UE, the at least three positioning nodes include at least one auxiliary UE, the auxiliary UE is located within an end-to-end communication range of the UE, and valid position information of the auxiliary UE exists currently;

a calculating unit 902, configured to calculate a current position of the UE according to the measurement result acquired by the acquiring unit 901 and the valid position information of the at least three positioning nodes.

In an application scenario, the positioning device further includes: a first judging unit and a selecting unit, where, the first judging unit is configured to judge whether none of valid position information of all other UEs within the end-to-end communication range of the UE exists, and the selecting unit is configured to when the judging result of the first judging unit is not, select the other UEs of which the valid position information exists as an auxiliary UE set. Furthermore, the positioning device 900 further includes: a second judging unit and a select positioning unit; where the second judging unit is configured to judge whether the end-to-end communication range of the UE is less than a preset range after the selecting unit is triggered, and the select positioning unit is configured to, when the judging result of the second judging unit is yes, select an auxiliary UE from the auxiliary UE set, and take the valid position information of the selected auxiliary UE as the valid position information of the UE; or, the select positioning unit may also be configured to, when the judging result of the second judging unit is yes, take centroids of position coordinates of all auxiliary UEs in the auxiliary UE set, and take the obtained centroid coordinates as the valid position information of the UE, which will not be limited herein. The acquiring unit 901 and the calculating unit 902 are triggered only when the judging result of the second judging unit is not.

In another application scenario, the positioning device 900 further includes a sending unit, configured to send positioning signal configuration information to the UE and the auxiliary UE in the at least three positioning nodes before the acquiring unit 901 acquires the measurement result of the UE, so that the auxiliary UE in the at least three positioning nodes sends a positioning signal to the UE according to transmit time and a transmit format specified according to the positioning signal configuration information.

The positioning device 900 in embodiments of the present invention may be a positioning server, and may also be a base station, which will not be limited herein.

It should be noted that, like the positioning device in the method embodiments of FIG. 4 and FIG. 5 above, the positioning device 900 in embodiments of the present invention may be used for implementing all technical solutions in the method embodiments described above, where functions of each of the functional modules thereof may be specifically implemented according to a method in the method embodiments described above, for details of the implementation procedure, reference may be made to relevant descriptions in the above method embodiments, which will not be limited herein.

As can be seen from the above, in embodiments of the present invention, other UEs within an end-to-end communication range of a UE and of which the valid position information exists are taken as auxiliary UEs of the UE for positioning, since the distance between UEs within the end-to-end range is relative short, thus a positioning error due to multiple reflections, refractions and attenuations of a signal caused by obstructions from buildings can be avoided, thereby improving the network positioning precision efficiently.

Figure 10:
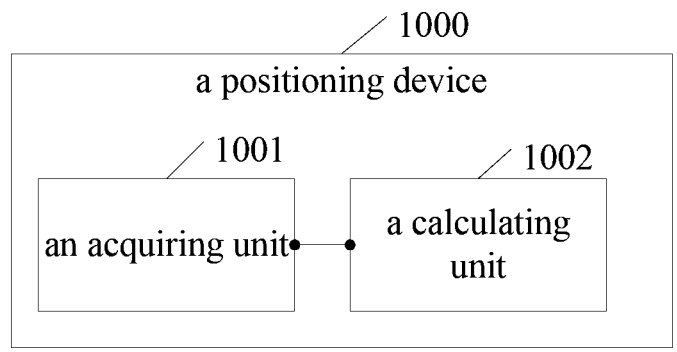
FIG. 10 is a schematic structural diagram of another positioning device according to an embodiment of the present invention.

The following describes another positioning device according to embodiments of the present invention, please refer to FIG. 10, a positioning device 1000 in embodiments of the present invention includes:

an acquiring unit 1001, configured to acquire measurement results of at least three positioning nodes, where the measurement results are obtained by the at least three positioning nodes by respectively measuring a positioning signal sent by a UE, and the measurement results include time of respectively receiving the positioning signal of the UE by the at least three positioning nodes, the at least positioning nodes include at least one auxiliary UE, the auxiliary UE is located within an end-to-end communication range of the UE, and valid position information of the auxiliary UE exists currently; and a calculating unit 1002, configured to calculate a current position of the UE according to the measurement results acquired by the acquiring unit 1001 and the valid position information of the at least three positioning nodes.

In an application scenario, the positioning device 1000 further includes a first judging unit and a selecting unit, where, the first judging unit is configured to judge whether none of valid position information of all other UEs within the end-to-end communication range of the UE exists; and, and the selecting unit is configured to, when the judging result of the first judging unit is not, select the other UEs of which the valid position information exists as an auxiliary UE set. Furthermore, the positioning device 1000 further includes: a second judging unit and a select positioning unit; where the second judging unit is configured to judge whether the end-to-end communication range of the UE is less than a preset range after the selecting unit is triggered, and the select positioning unit is configured to, when the judging result of the second judging unit is yes, select an auxiliary UE from the auxiliary UE set, take the valid position information of the selected auxiliary UE as the valid position information of the UE; or, the select positioning unit may also be configured to, when the judging result of the second judging unit is yes, take centroids of position coordinates of all auxiliary UEs in the auxiliary UE set, and take the obtained centroid coordinates as the valid position information of the UE, which will not be limited herein. The acquiring unit 1001 and the calculating unit 1002 are triggered only when the judging result of the second judging unit is not.

In another application scenario, the positioning device 1000 further includes a sending unit, configured to send positioning signal configuration information of the UE to the auxiliary UE in the at least three positioning nodes after the acquiring unit 1001 acquires the measurement results of the at least three positioning nodes, so that the auxiliary UE in the at least three positioning nodes receives a positioning signal sent by the UE according to transmit time and a transmit format specified according to the positioning signal configuration information.

The positioning device 1000 in embodiments of the present invention may be a UE, or a positioning server, and may also be a base station, which will not be limited herein.

It should be noted that, like the positioning device in the method embodiments of FIG. 6 and FIG. 7 above, the positioning device 1000 in embodiments of the present invention may be used for implementing all technical solutions in the method embodiments above, where functions of each of the functional modules thereof may be specifically implemented according to a method in the method embodiments described above, for details of the implementation procedure, reference may be made to relevant descriptions in the above embodiments, which will not be limited herein.

As can be seen from the above, in embodiments of the present invention, other UEs within an end-to-end communication range of a UE and of which the valid position information exists are taken as auxiliary UEs of the UE for positioning, since the distance between UEs within the end-to-end range is relative short, thus a positioning error due to multiple reflections, refractions and attenuations of a signal caused by obstructions from buildings can be avoided, thereby improving the network positioning precision efficiently.

Persons skilled in the art may clearly know that, for the purpose of convenient and brief description, for a detailed working process of the apparatus and units described foregoing, reference may be made to corresponding processes in the foregoing method embodiments, which will not be repeated herein.

In several embodiments provided by the present application, it should be understood that the disclosed apparatus and methods may be implemented in other modes. For example, the described device embodiments are merely schematic. For example, the unit division is merely logical function division and may be other division in actual implementations. For example, a plurality of units or components may be combined or integrated into another system, or some features may be ignored or may not be performed. In addition, the displayed or discussed couplings or direct couplings or communication connections may be implemented through some interfaces. The indirect couplings or communication connections between the apparatuses or units may be implemented in electronic, mechanical or other forms.

The units described as separating parts may be or may not be physically separated, and parts displayed as units may be or may not be physical units, i.e. may be located in one place or may be distributed on a plurality of network units. A part of or all of the units may be selected according to actual needs so as to realize the purpose of the technical solutions of embodiments of the present invention.

In addition, functional units in embodiments of the present invention may be integrated into one processing unit, or each of the units may exist alone physically, or two or more units are integrated into one unit. The integrated unit may be implemented through hardware, or may also be implemented in a form of hardware plus a software functional module.

If the integrated unit is realized in the form of software function unit and is for sale or used as an independent product, it may be stored in a computer readable storage medium. Based on such understanding, the essence of the technical solutions of the present invention, or the parts which contribute to the prior art, or a part of or all of the technical solutions, may be embodied in the form of a software product. The computer software product is stored in a storage medium, which includes some instructions for enabling a computer device (may be a personal computer, a server, or a network equipment, etc.) to perform all or a part of the steps of the method as described in each embodiment of the present invention. The above-mentioned storage medium includes various media which can store program codes such as a U-disk, a mobile hard disk, a read-only memory (ROM), a random access memory (RAM), a disk, and a CD.

The above describes in details about a network positioning method and related devices provided by the present invention, as for persons of ordinary skill in the art, according to the concept of embodiments of the present invention, there will be modifications to both the specific implementation method and the application scope. In conclusion, contents of the present description shall not be interpreted as a limitation to the present invention.

What is claimed is:

1. A network positioning method, comprising:
   determining, by a user equipment (UE), whether an end-to-end communication range of the UE is smaller than a preset range, wherein the end-to-end communication range of the UE is a device-to-device (D2D) communication range of the UE, and the preset range is a threshold value set by a network side according to positioning precision; and
   determining, by the UE, a current position of the UE, wherein determining the current position of the UE comprises:
   in case the end-to-end communication range of the UE is not smaller than the preset range: receiving, by the UE, positioning signals of at least three positioning nodes, wherein the at least three positioning nodes comprise an auxiliary UE, wherein the auxiliary UE is located within the end-to-end communication range of the UE, and the auxiliary UE is determined by the UE to have valid position information; measuring, by the UE, the positioning signals to obtain a measurement result, wherein the measurement result comprises time difference information based on the time at which the UE received each of the positioning signals; and calculating, by the UE, a current position of the UE according to the measurement result, the valid position information of the auxiliary UE and valid position information of other positioning nodes of the at least three positioning nodes; and in case the end-to-end communication range of the UE is smaller than the preset range: taking the valid position information of the auxiliary UE as the current position of the UE; or taking a centroid relative to position coordinates of all the UEs in an auxiliary UE set, and taking the obtained centroid coordinate as the current position of the UE.

2. The method according to claim 1, wherein, before receiving the positioning signals, the method further comprises:

determining whether valid position information corresponding to other UEs within the end-to-end communication range of the UE exists; and in response to determining that valid position information exists for at least some of the other UEs within the end-to-end communication range of the UE, selecting the other UEs for which valid position information exists as the auxiliary UE set;

wherein the auxiliary UE is selected from the auxiliary UE set.

3. The method according to claim 1, wherein determining the current position of the UE in case the end-to-end communication range is not smaller than the preset range further comprises, before receiving the positioning signals:

sending positioning signal configuration information to the auxiliary UE, so as to enable the auxiliary UE to send a positioning signal to the UE according to a transmit time and a transmit format specified according to the positioning signal configuration information.

4. The method according to claim 1, wherein the valid position information comprises position information which satisfies an interval between a positioning time and a current time being within a specified time range, wherein the positioning time is a time when the position information is acquired, and the specified time range is a parameter configured by the network side.

5. A user equipment (UE), comprising:

a processor, configured to determine whether an end-to-end communication range of the UE is smaller than a preset range, wherein the end-to-end communication range of the UE is a device-to-device (D2D) communication range of the UE, and the preset range is a threshold value set by a network side according to positioning precision;

a receiver, configured to receive positioning signals of at least three positioning nodes, wherein the at least three positioning nodes comprise an auxiliary UE, wherein the auxiliary UE is located within the end-to-end communication range of the UE, and the auxiliary UE is determined by the UE to have valid position information;

wherein the processor is further configured to determine a current position of the UE, wherein determining the current position of the UE comprises:

in case the end-to-end communication range of the UE is not smaller than the preset range: measuring the positioning signals to obtain a measurement result, wherein the measurement result comprises time difference information based on the time at which the UE received each of the positioning signals; and calculating the current position of the UE according to the measurement result, the valid position information of the auxiliary UE and valid position information of other positioning nodes of the at least three positioning nodes; and in case the end-to-end communication range of the UE is smaller than the preset range: taking the valid position information of the auxiliary UE as the current position of the UE; or taking a centroid relative to position coordinates of all the UEs in an auxiliary UE set, and taking the obtained centroid coordinate as the current position of the UE.

6. The UE according to claim 5, wherein the processor is further configured to:

determine whether valid position information corresponding to other UEs within the end-to-end communication range of the UE exists; and select, in response to determining that valid position information exists for at least some of the other UEs within the end-to-end communication range of the UE, the other UEs for which valid position information exists as the auxiliary UE set;

wherein the auxiliary UE is selected from the auxiliary UE set.

7. The UE according to claim 5, wherein the UE further comprises:

a transmitter, configured to send positioning signal configuration information to the auxiliary UE, so as to enable the auxiliary UE to send a positioning signal to the UE according to a transmit time and a transmit format specified according to the positioning signal configuration information.

8. The UE according to claim 5, wherein the valid position information comprises position information which satisfies an interval between a positioning time and a current time being within a specified time range, wherein the positioning time is a time when the position information is acquired, and the specified time range is a parameter configured by the network side.

* * * * *